(12) United States Patent
Chen (10) Patent No.: US 11,048,104 B2
(45) Date of Patent: Jun. 29, 2021

(54) GLASSES WITH PROTECTIVE COVERS

(71) Applicant: ARGUS VISION INTERNATIONAL LIMITED, Tainan (TW)

(72) Inventor: Lin Yun Chen, Tainan (TW)

(73) Assignee: ARGUS VISION INTERNATIONAL LIMITED, Tainan (TW)

(*) Notice: Subject to any disclaimer, the term of this patent is extended or adjusted under 35 U.S.C. 154(b) by 253 days.

(21) Appl. No.: 16/449,471

(22) Filed: Jun. 24, 2019

(65) Prior Publication Data
US 2020/0142223 A1 May 7, 2020

(30) Foreign Application Priority Data

Nov. 5, 2018 (TW) .................................. 107139108

(51) Int. Cl.
*G02C 7/10* (2006.01)
*G02C 11/00* (2006.01)
*G02C 5/14* (2006.01)

(52) U.S. Cl.
CPC .............. *G02C 11/12* (2013.01); *G02C 5/146* (2013.01); *G02C 2200/06* (2013.01)

(58) Field of Classification Search
CPC ... G02C 7/10; G02C 5/14; G02C 1/00; G02C 5/146; G02C 11/12; G02C 2200/06; A61F 9/00; A61F 9/02; A61F 9/04

USPC ........ 351/44, 41, 111, 121, 158; 2/449, 451, 2/450, 448, 12, 13, 426, 431, 432
See application file for complete search history.

(56) References Cited

U.S. PATENT DOCUMENTS 10,627,652 B2 * 4/2020 Froissard ............. G02C 13/001

OTHER PUBLICATIONS

The attached document was cited in a Taiwan Search Report for counterpart Taiwan Application No. 107139108 (an English translation is included).

* cited by examiner

*Primary Examiner* — Hung X Dang
(74) *Attorney, Agent, or Firm* — Bruce Stone LLP; Joseph A. Bruce (57) ABSTRACT

Provided is a pair of glasses having protective covers, including a frame, two temples, two protective covers and two guiding members. Each side of the frame has a pivot part and at least one socket, and the at least one socket includes a fastening hole. Each of the two temples is provided with a track along its length, and each track has a first end and a second end separated from the first end. Each protective cover includes an upper shield portion. Each guiding member is provided on an outer side of each track, and includes a fastening slot. The fastening slot is pivotally connected to the second pivot shaft. When each of the two temples is in a deployed position, the upper shield portion and the side shield portion are adjacent to the inner side of the frame and the inner side of the temple.

6 Claims, 9 Drawing Sheets

GLASSES WITH PROTECTIVE COVERS

BACKGROUND OF THE INVENTION

1. Field of the Invention

The present disclosure relates to a pair of glasses, and particularly relates to a pair of glasses having protective covers.

2. The Prior Arts

In order to protect operators from harm by mechanical or chemical particles, such as splashing particles and splashing chemicals, the operators in the industry will wear appropriate protective glasses during their work. Moreover, early industrial safety glasses have no gaps to ensure coverage. The protective cover provided on the glasses is integrally formed of plastic to prevent outside particles from entering the eyes of the wearer. However, since the protective glasses are integrally formed, the temples cannot be bent, resulting in difficulty in storage.

In addition, there is a protective eyeglass, and its protective cover is detachably assembled on the eyeglasses. The protective cover is mainly assembled on the outer side of the temple by screws or embedded, which can solve the above disadvantage of integral forming, but the matting sheets are often disassembled, the joints are easily lost, and the parts are also easily lost. Moreover, since the mating sheets of this type are separately provided, the contours of the side profiles generally cannot conform to the frames. Although most of the areas have been obscured, the outside particle splashed in the work may still be invaded by the slits. Further, most of the attached matting sheets are placed on the outside of the temples, and few matting sheets are available for assembling the pivot joints of the frame and the temple to form a bare area. Therefore, there are still many defects and inconveniences for the prior art glasses and protective covers.

SUMMARY OF THE INVENTION

In light of the foregoing problems, an objective of the present disclosure is to provide a structure with safety protection on the top and side of glasses. The safety protection is pivotally connected to the glasses, and can be folded and unfolded with temples.

In order to achieve the above objective, the present disclosure provides a pair of glasses having protective covers, including a frame, having lenses, wherein each side of the frame has a pivot part and at least one socket, and the at least one socket includes a fastening hole; two temples, each temple pivoted on the pivot part, wherein each of the two temples is provided with a track along its length, and each track has a first end and a second end separated from the first end; two protective covers, each protective cover including an upper shield portion, wherein one first pivot shaft is pivotally connected to a fastening hole, the upper shield portion has a first side edge and a second side edge adjacent to each other, a side shield portion is disposed on the second side edge, the side shield portion has one second pivot shaft, and the first side edge, the second side edge and the side shield portion are operatively adjacent to or separated from an inner side of the frame and an inner side of the temple; and two guiding members, each guiding member provided on an outer side of each track and including a fastening slot, wherein the fastening slot is pivotally connected to the second pivot shaft.

According to the present disclosure, when each of the two temples is in a deployed position, the upper shield portion and the side shield portion are adjacent to the inner side of the frame and the inner side of the temple, and when each of the two temples is in a folded position, the upper shield portion and the side shield portion are pivoted relative to the frame and the temple according to a pivot defined by the first pivot shaft and the second pivot shaft, and the second pivot shaft and the guiding member are pivoted along the first pivot shaft to move from the first end to the second end along the track.

DETAILED DESCRIPTION OF THE PREFERRED EMBODIMENT

The detailed description of the present invention is provided in combination with the accompanying drawings.

As shown in FIGS. 1-4, according to a preferred embodiment of the present disclosure, a pair of glasses having protective covers mainly includes: a frame 2, two temples 3, two protective covers 4 and two guiding members.

The frame 2 has an outer surface 21 and an inner surface 22 relative to the outer surface 21 along the thickness direction. Two pivot parts 23 are respectively disposed on both sides of the frame 2 in the longitudinal direction. Two sockets 24 are respectively provided between the top of the inner surface 22 of the frame 2 and the pivot parts 23. Each socket 24 is provided with a fastening hole. Moreover, in this preferred embodiment, the frame 2 is provided with two lens support portions, and further has a lens. The lenses may be two-sided lenses, which are respectively fixed to the lens support portions, but not limited thereto. When the lenses are one-sided lenses, the number of the lens supporting portions is one.

Figure 6:
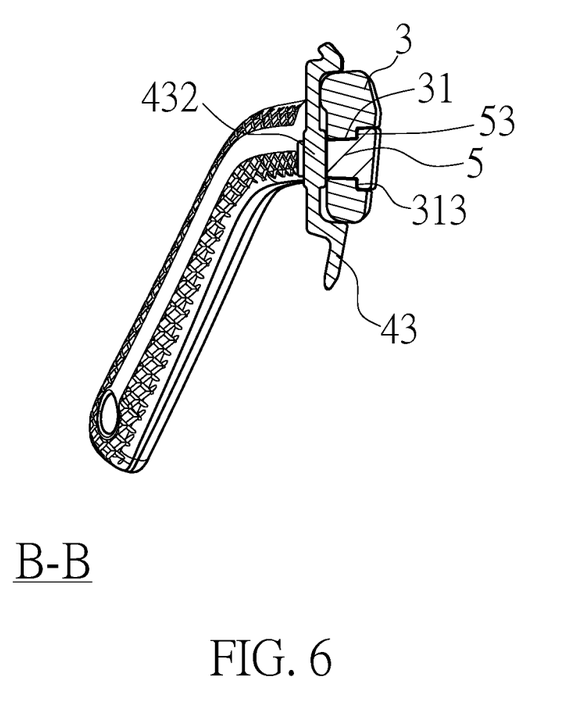
FIG. 6 shows a cross-sectional diagram taken along the B-B line of FIG. 4 according to the present disclosure.

Each of the temples 3 is pivotally disposed on each of the pivot parts 23, and a track 31 is disposed along the length of the temple 3. Each of the tracks 31 has a first end 311 and a second end 312. In this embodiment, the track 31 is an elongated hole extending through the thickness direction of the temple 3, and a stepped portion 313 is disposed between the first end 311 and the second end 312 on the outer side of the track 31, as shown in FIG. 6.

Figure 1:
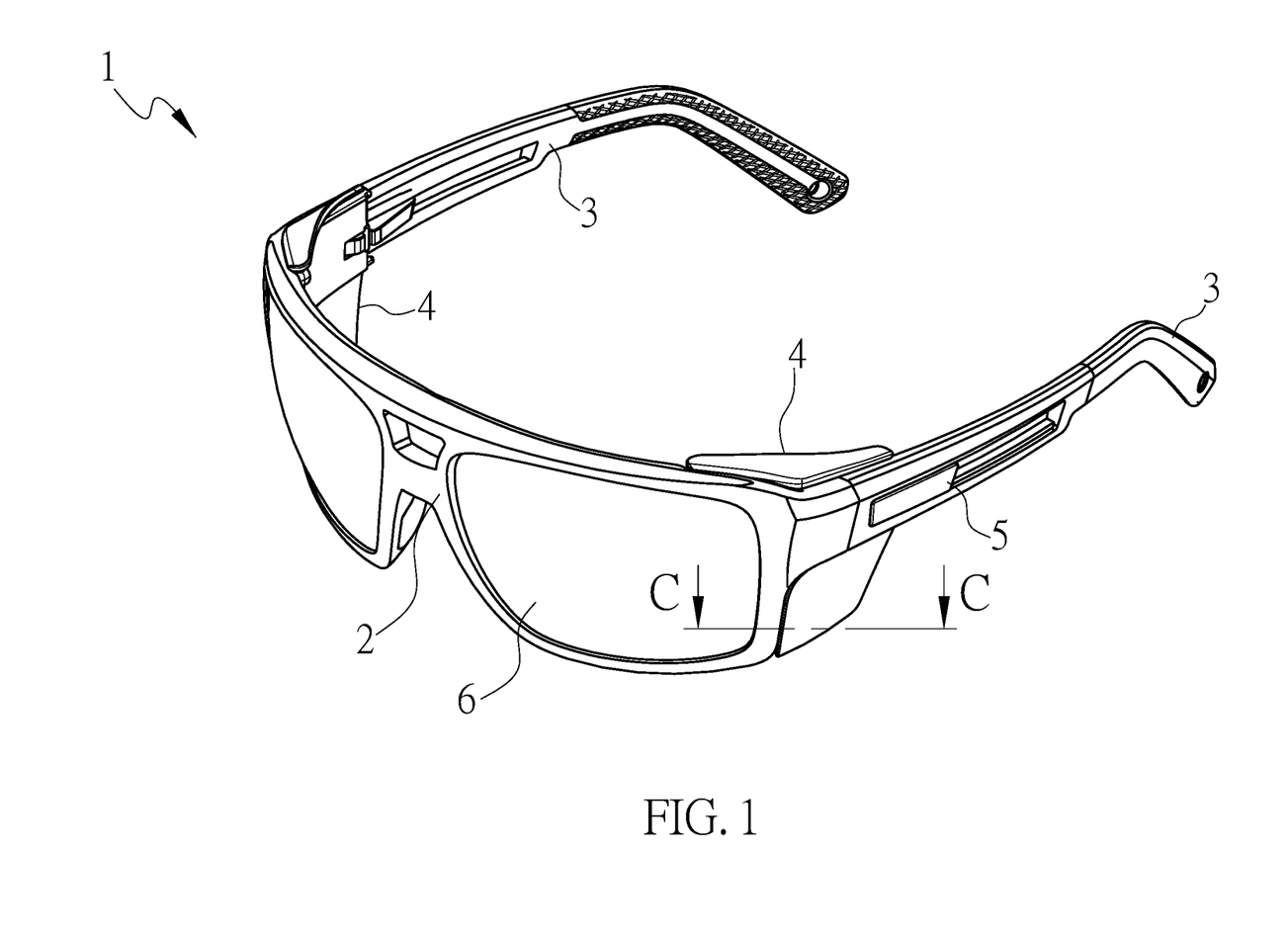
FIG. 1 is a three-dimensional schematic diagram of a pair of glasses having protective covers according to the present disclosure.
Figure 2:
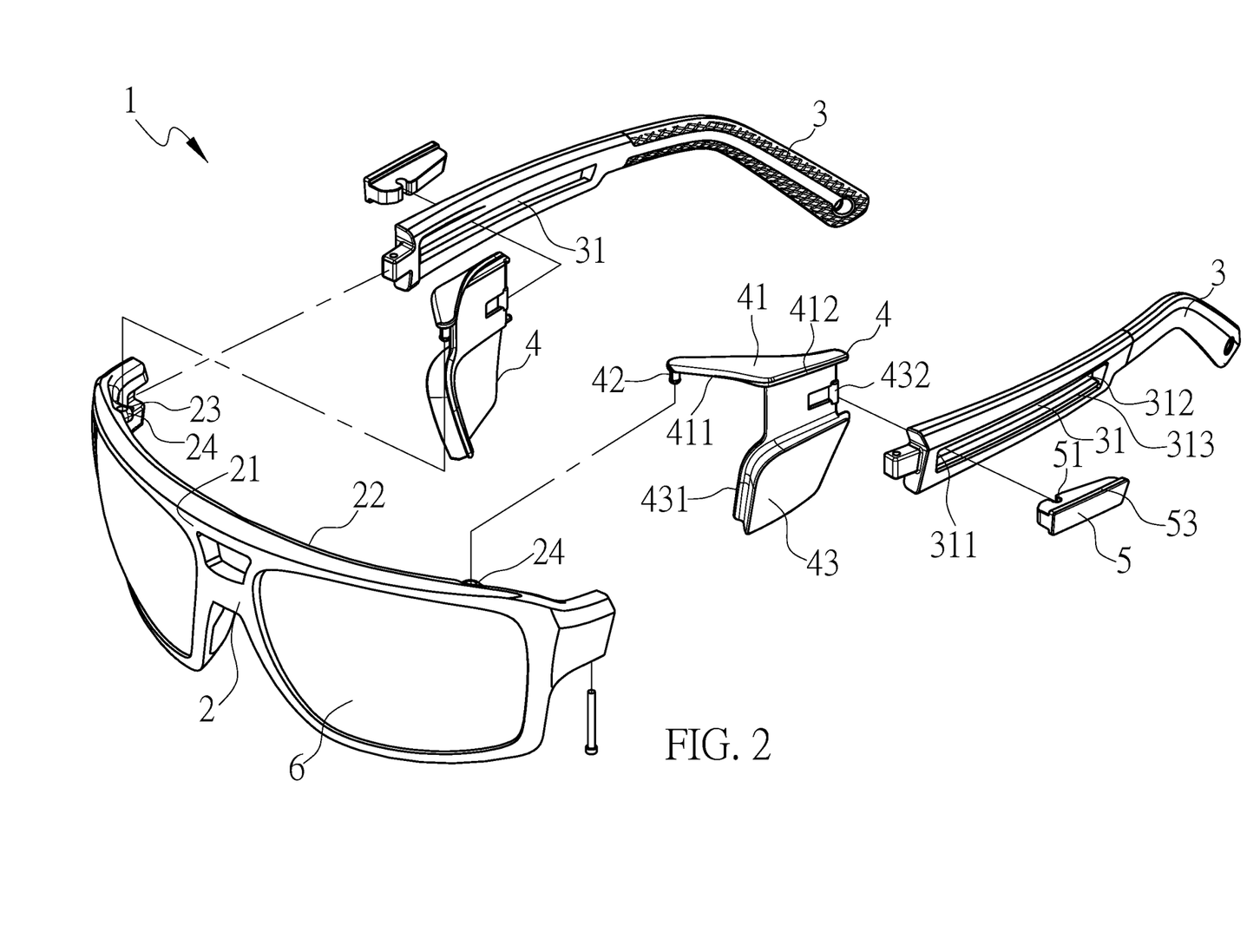
FIG. 2 is a three-dimensional exploded schematic diagram of the pair of glasses according to the present disclosure.
Figure 3:
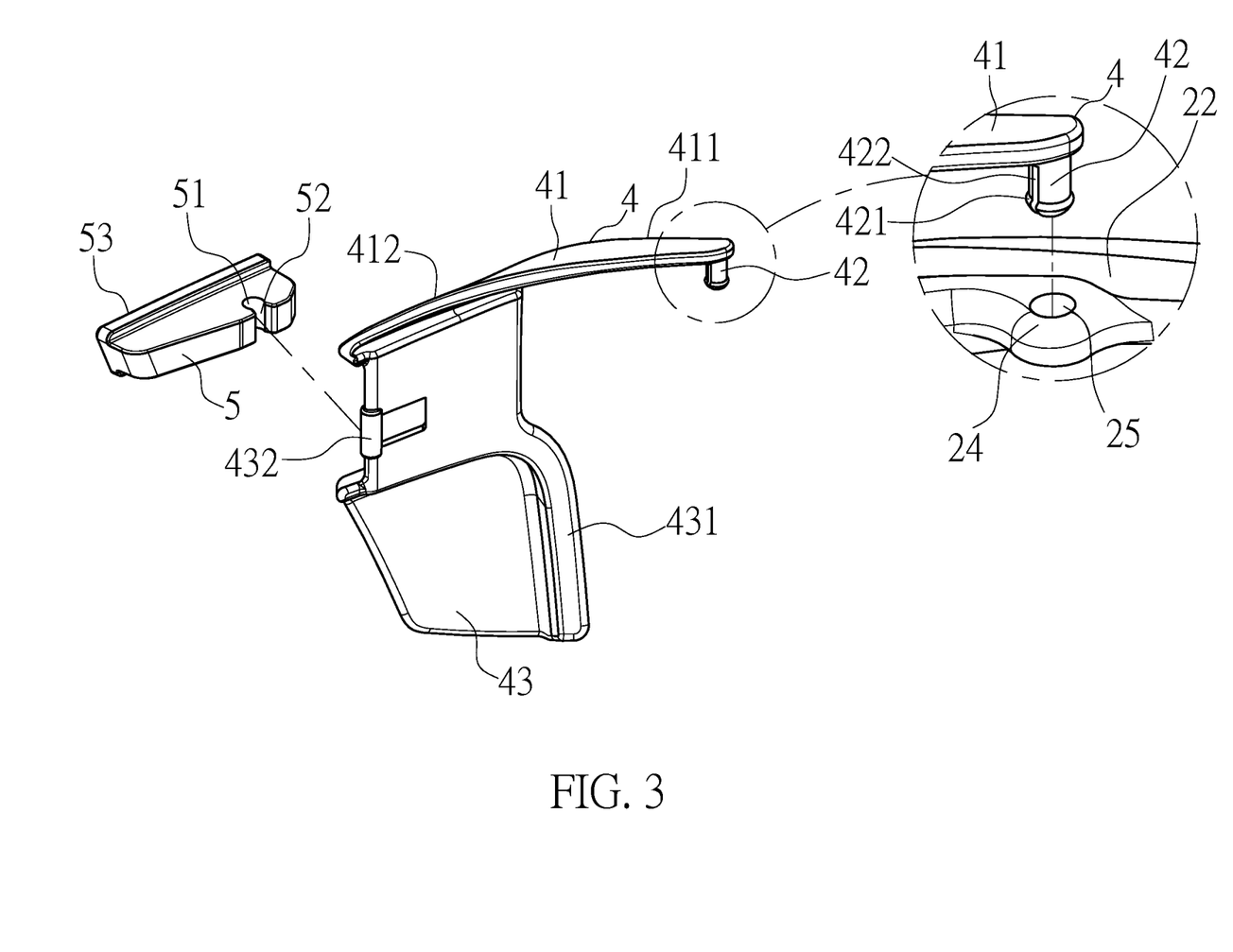
FIG. 3 is a partial three-dimensional exploded schematic diagram of the pair of glasses according to the present disclosure.
Figure 4:
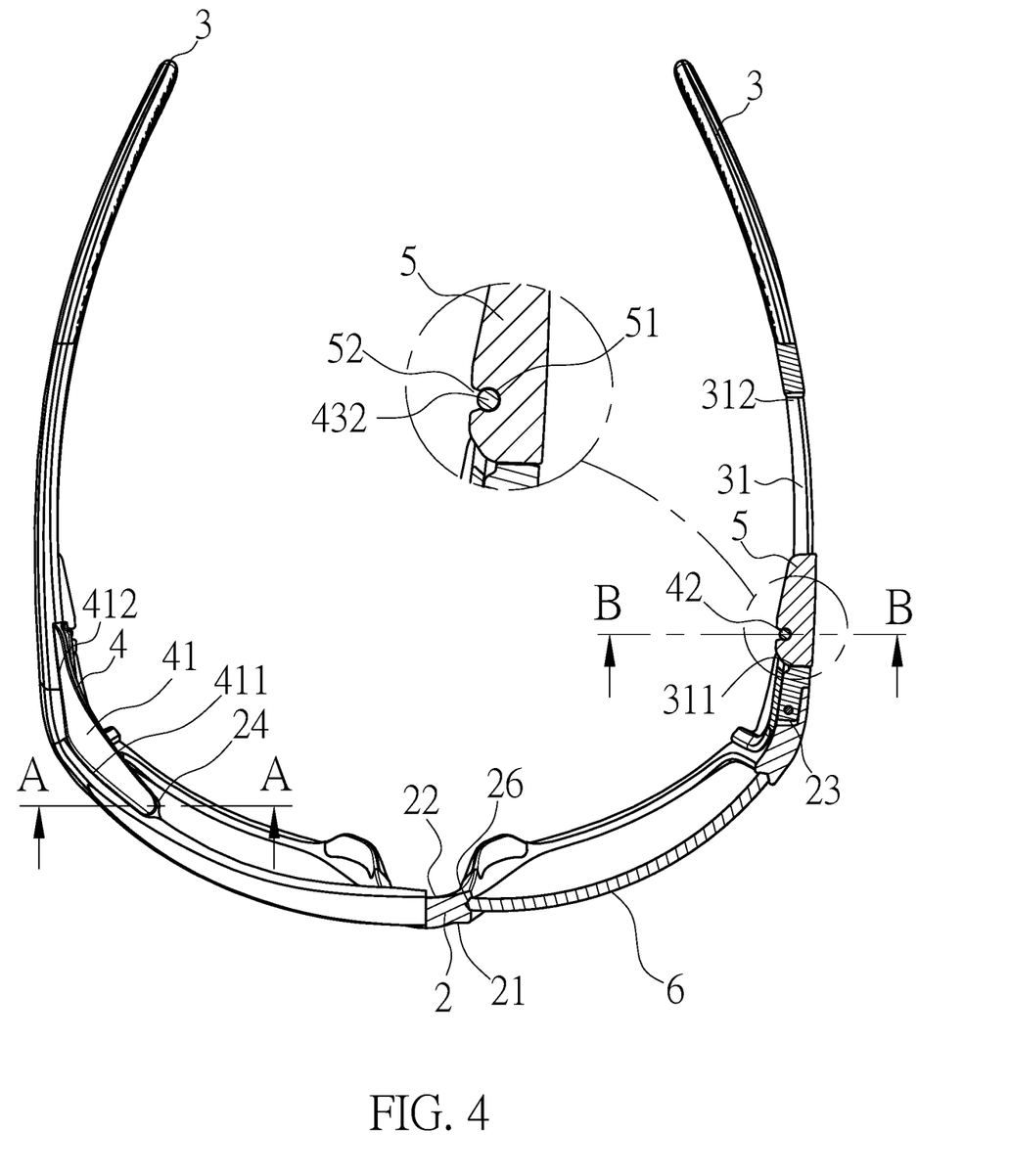
FIG. 4 shows a partial cross-sectional diagram of the pair of glasses according to the present disclosure.
Figure 5:
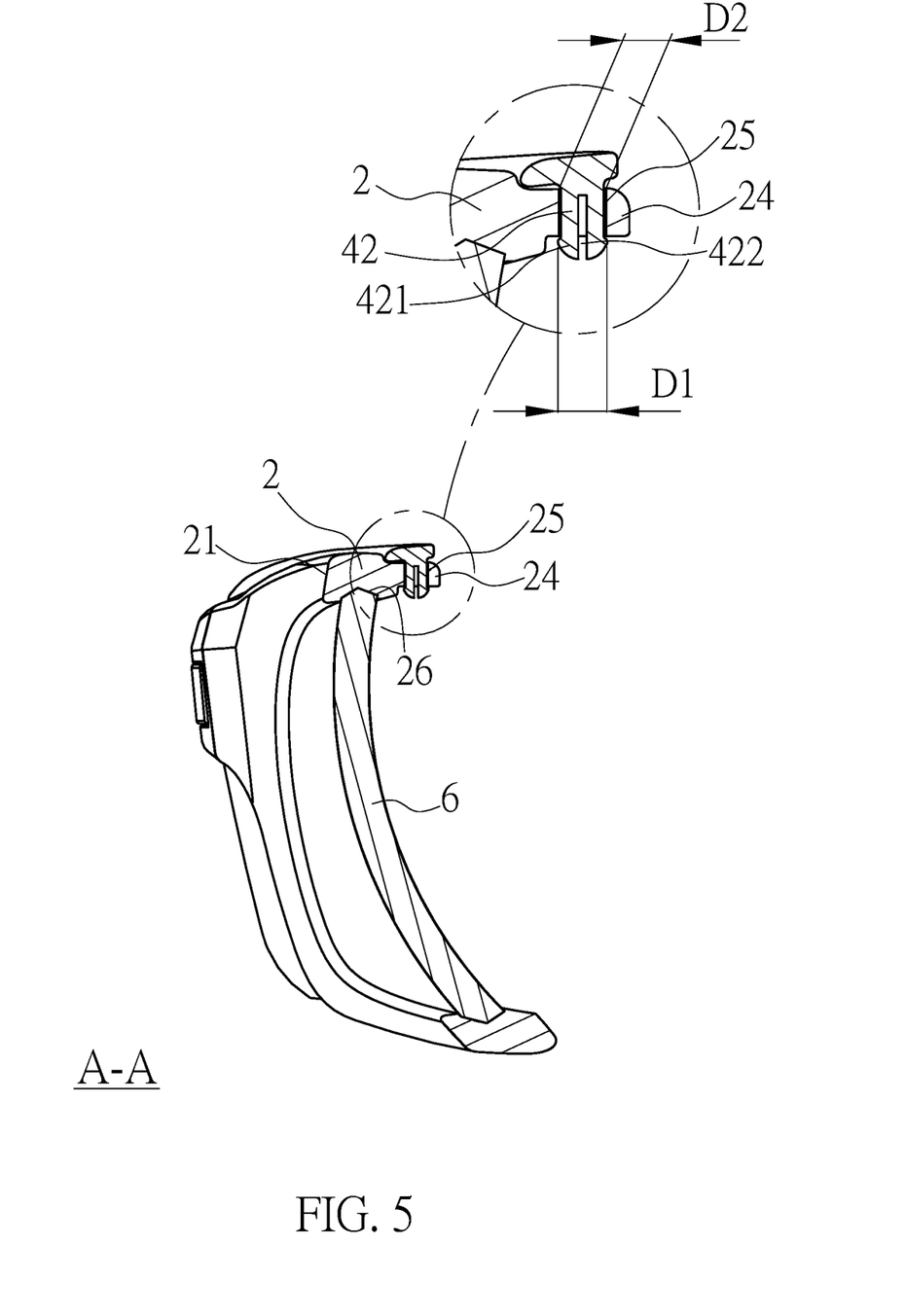
FIG. 5 shows a cross-sectional diagram taken along the A-A line of FIG. 4 according to the present disclosure.

As shown in FIG. 5, each of the protective covers 4 has an upper shield portion 41, and the upper shield portion 41 is provided with a first pivot shaft 42 pivotally connected to one of the fastening holes 25. One end of the first pivot shaft 42 is provided with a head 421 having an outer diameter D1 larger than the width D2 of the fastening hole 25, and further having a groove 422 running through a radial direction of the head 421 and the first pivot shaft 42. The first pivot shaft 42 is embedded in the fastening hole 25 by the head 421. During the embedding process, The head 421 includes a compression space that is the groove 422, and is formed tightly with the hole wall of the fastening hole 25. After the head 421 passes through the fastening hole 25, the head 421 will rebound back to the original width D1 and under the socket 24, thereby limiting the axial displacement of the protective cover 4 relative to the socket 24.

Furthermore, the upper shield portion 41 has a first side edge 411 and a second side edge 412 adjacent to each other. The second side edge 412 is provided with a side shield portion 43 on the inner side of the temple 3, and each side shield portion 43 extends adjacent to the side of the frame 2 to form an L-shaped lateral wing 431. The side shield portion 43 is provided with a second pivot shaft 432 on the inner side of the track 31. The first side edge 411 and the second side edge 412 of the upper shield portion 41 and the side shield portion 43 can be operatively adjacent or separated from the inner side the frame 2 and the inner side of the temple 3. In this embodiment, the socket 24, the first pivot shaft 42 and the second pivot shaft 432 are respectively disposed on both sides of the frame 2, but not limited thereto. A plurality of sockets 24, the first pivot shaft 42 and the second pivoting shaft 432 may be respectively disposed on both sides of the frame 2 according to structural requirements.

Each of the guiding members 5 is respectively disposed on an outer side of each of the tracks 31, and each of the guiding members 5 is provided with a fastening slot 51. Each of the fastening slots 51 is an aperture 52. The outer diameter of the second pivot shaft 432 is greater than the width of the aperture 52. Each of the fastening slots 51 is pivotally connected to the second pivot shaft 432. The guiding member 5 urges the second pivot shaft 432 into the fastening slot 51 by the aperture 52. The second pivot shaft 432 can be operably pivoted in the fastening slot 51. Each of the guiding members 5 is provided with a shoulder 53. When the guiding member 5 is pivotally connected to the second pivot shaft 432, the shoulder 53 abuts against the stepped portion 313 to form a restriction.

Figure 7:
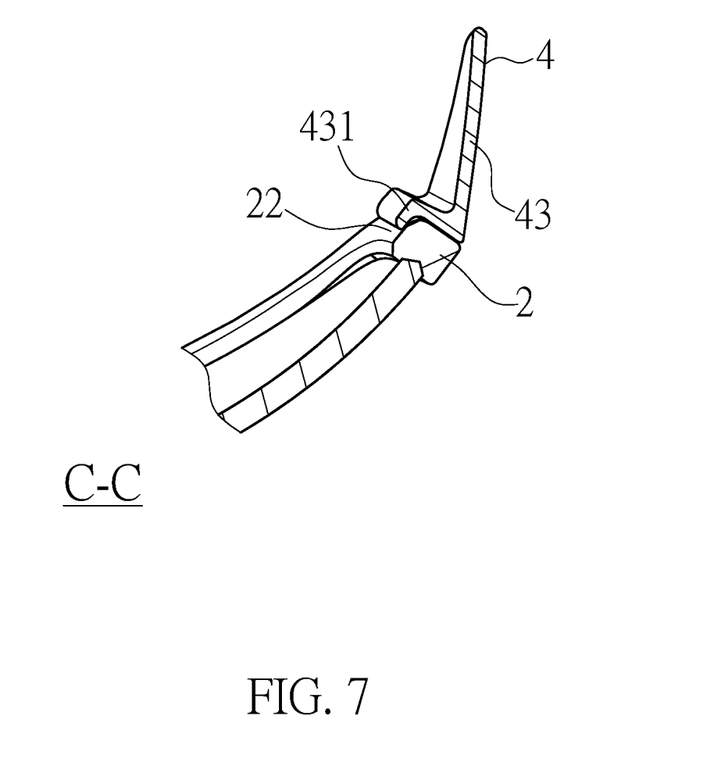
FIG. 7 shows a cross-sectional diagram take along the C-C line of FIG. 1 according to the present disclosure.

As shown in FIGS. 4-9, when each of the temples 3 is in a deployed position, the first side edge 411 and the second side edge 412 of each of the upper shield portion 41 will be placed on tops of the frame 2 and the temple 3 to shield the frame 2. The bare space is defined by the temple 3 and the glasses wearer's face (not shown). The side shield portion 43 is adjacent to the frame 2. As shown in FIG. 7, the lateral wing 431 is disposed on the periphery of the frame 2 and the inner surface 22 in a state of being superposed adjacent to the frame 2, and completely shields both sides of the glasses wearer's eyes to form a top and side safety protection; further, the structure having the first side edge 411, the second side edge 412 that are disposed on the frame 2 and the temple 3 can increase the stability of the protective cover 4 disposed on the glasses 1.

Figure 8:
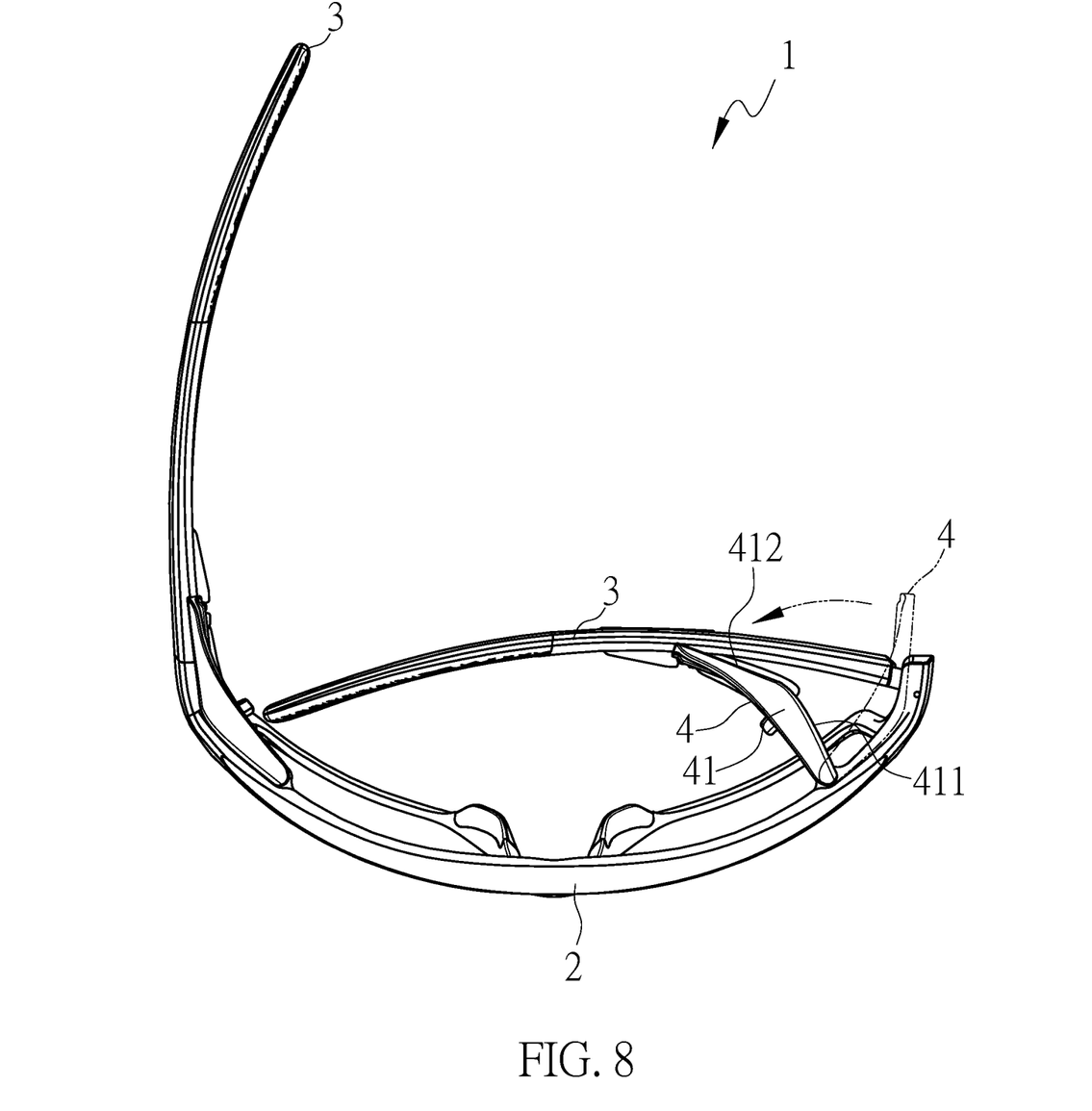
FIG. 8 is a top schematic diagram showing the folding of the temple according to the present disclosure.
Figure 9:
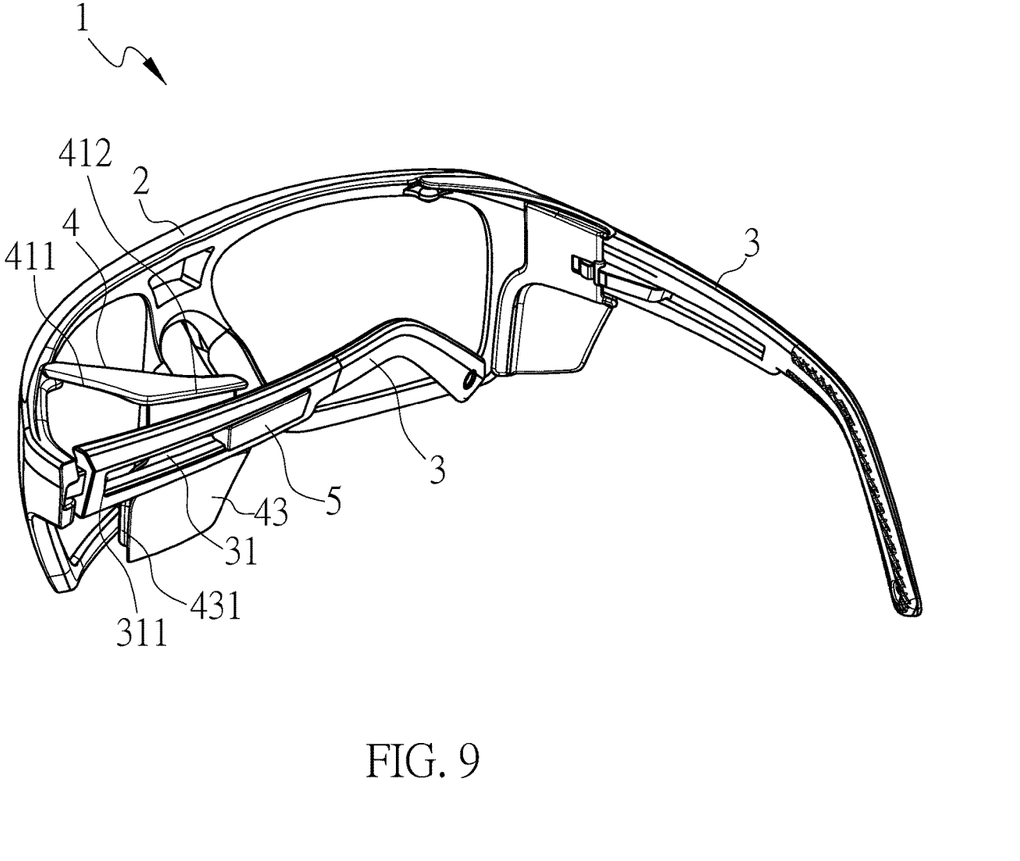
FIG. 9 is a three-dimensional diagram showing the folding of the temple according to the present disclosure.

When each of the temples 3 is in a retracted position, each of the upper shield portion 41 and the side shield portion 43 is pivoted relative to the frame 2 and the temple 3 based on the two axes defined by the first pivot shaft 42 and the second pivoting shaft 432. The second pivot shaft 432 and the guiding member 5 follow the first pivot shaft 42 to pivot and to move to the second end 312 along the first end 311 of the track 31. Since two axes are defined by the first pivot shaft 42 and the second pivot shaft 432, the structural design allows the protective cover 4 to be rotated over a relatively small angle and folded to an appropriate position with the temple 3 without affecting the storage of the glasses 1.

In summary, the advantages of the present disclosure over the prior art are: 1. The protective cover is directly pivoted on the glasses to avoid missing parts; 2. The protective cover having an upper shield portion and a side shield portion can cover the top bare space and both sides of the eyes, so as to achieve the best safety protection; and 3. The protective cover having a structural design of pivoting the two axes at the same time can be rotated in a large angle with a small range, and can be folded with the temples to reduce the volume of the glasses for storage.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A pair of glasses having protective covers, comprising:
   a frame, having lenses, wherein each side of the frame has a pivot part and at least one socket, and the at least one socket includes a fastening hole;
   two temples, each temple pivoted on the pivot part, wherein each of the two temples is provided with a track along its length, and each track has a first end and a second end separated from the first end;
   two protective covers, each protective cover including an upper shield portion, wherein one first pivot shaft is pivotally connected to a fastening hole, the upper shield portion has a first side edge and a second side edge adjacent to each other, a side shield portion is disposed on the second side edge, the side shield portion has one second pivot shaft, and the first side edge, the second side edge and the side shield portion are operatively adjacent to or separated from an inner side of the frame and an inner side of the temple; and
   two guiding members, each guiding member provided on an outer side of each track and including a fastening slot, wherein the fastening slot is pivotally connected to the second pivot shaft,
   wherein when each of the two temples is in a deployed position, the upper shield portion and the side shield portion are adjacent to the inner side of the frame and the inner side of the temple, and
   wherein when each of the two temples is in a folded position, the upper shield portion and the side shield portion are pivoted relative to the frame and the temple according to a pivot defined by the first pivot shaft and the second pivot shaft, and the second pivot shaft and the guiding member are pivoted along the first pivot shaft to move from the first end to the second end along the track.

2. The pair of glasses having the protective covers of claim 1, wherein one end of the first pivot shaft is provided with a head that is exposed to the fastening hole, a diameter of the head is larger than a diameter of the fastening hole, and a split groove is provided through the head and inside the first pivot shaft.

3. The pair of glasses having the protective covers of claim 1, wherein each track extends through the thickness direction of each temple, the first end and the second end of each track are provided with a stepped portion, the fastening slot of each guiding member is pivotally connected to the second pivot shaft across each track, each guiding member is provided with a shoulder, and the shoulder is abutted against the stepped portion.

4. The pair of glasses having the protective covers of claim 1, wherein each fastening slot is provided with an aperture extending from top to bottom, and the width of the second pivot shaft is greater than the width of the aperture.

5. The pair of glasses having the protective covers of claim 1, wherein the side shield portion adjacent to the side of the frame is provided with a lateral wing, when each of the temples is unfolded, the upper shield portion is partially disposed on the top of the frame and each of the temples, and the lateral wing is disposed on the periphery of the frame.

6. The pair of glasses having the protective covers of claim 1, wherein the lenses are one-sided lenses or two-sided lenses.

* * * * *